(12) United States Patent
Lobez Comeras

(10) Patent No.: US 9,334,162 B2
(45) Date of Patent: May 10, 2016

(54) SURFACE MODIFICATION USING FUNCTIONAL CARBON NANOTUBES

(71) Applicant: GLOBALFOUNDRIES INC., Grand Cayman (KY)

(72) Inventor: Jose M. Lobez Comeras, New York, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 191 days.

(21) Appl. No.: 14/031,611

(22) Filed: Sep. 19, 2013

(65) Prior Publication Data

US 2014/0363641 A1    Dec. 11, 2014

Related U.S. Application Data

(63) Continuation of application No. 13/912,417, filed on Jun. 7, 2013.

(51) Int. Cl.
| | | |
|---|---|---|
| *B82B 3/00* | (2006.01) | |
| *C08G 75/00* | (2006.01) | |
| *B82Y 40/00* | (2011.01) | |

(Continued)

(52) U.S. Cl.
CPC .............. *B82B 3/0014* (2013.01); *B82Y 40/00* (2013.01); *C08G 75/00* (2013.01); *C09D 1/00* (2013.01); *C09D 5/00* (2013.01); *C09D 7/1266* (2013.01); *C08K 3/04* (2013.01); *Y10T 428/24802* (2015.01); *Y10T 428/24851* (2015.01); *Y10T 428/24893* (2015.01); *Y10T 428/25* (2015.01); *Y10T 428/254* (2015.01); *Y10T 428/2998* (2015.01)

(58) Field of Classification Search
CPC ................ B82B 3/0014; B82Y 40/00; Y10T 428/24802; Y10T 428/24893; Y10T 428/24851; Y10T 428/2998
See application file for complete search history.

(56) References Cited

U.S. PATENT DOCUMENTS

| | | |
|---|---|---|
| 6,790,425 B1 | 9/2004 | Smalley et al. |
| 6,891,227 B2 | 5/2005 | Appenzeller et al. |

(Continued)

OTHER PUBLICATIONS

H. Park et al., "High-density integration of carbon nanotubes via chemical self-assembly," Nature Nanotechnology 7, 787-791 (Oct. 2012).

(Continued)

*Primary Examiner* — Gerard Higgins
(74) *Attorney, Agent, or Firm* — Anthony Canale; Andrew M. Calderon; Roberts, Mlotkowski, Safran & Cole PC

(57) ABSTRACT

Techniques for CNT solubilization and surface-selective deposition via polymer-mediated assembly are provided. In one aspect, a method for self-assembly of CNTs on a substrate is provided. The method includes the following steps. One or more surfaces of the substrate are coated with a thiol-reactive compound. The substrate is contacted with carbon nanotube-polymer assemblies dispersed in a solvent, wherein the carbon nanotube-polymer assemblies include the carbon nanotubes wrapped in a polymer having side chains with thiol groups. Wherein by way of the step of contacting the substrate with the carbon nanotube-polymer assemblies, the carbon nanotube-polymer assemblies selectively bind to the surfaces of the substrate based on an interaction between the thiol groups in the polymer and the thiol-reactive compound on the surfaces of the substrate and thereby self-assemble on the substrate.

8 Claims, 7 Drawing Sheets

(51) Int. Cl.
*C09D 1/00* (2006.01)
*C09D 5/00* (2006.01)
*C09D 7/12* (2006.01)
*C08K 3/04* (2006.01)

(56) References Cited

U.S. PATENT DOCUMENTS

| | | | |
|---|---|---|---|
| 7,008,563 | B2 | 3/2006 | Smalley et al. |
| 7,244,499 | B2 | 7/2007 | Sugiyama et al. |
| 7,504,132 | B2 | 3/2009 | Afzali-Ardakani et al. |
| 8,084,012 | B2 | 12/2011 | Afzali-Ardakani et al. |
| 8,212,132 | B2 | 7/2012 | Swager et al. |
| 2010/0038597 | A1 | 2/2010 | Reynolds et al. |
| 2010/0304101 | A1 | 12/2010 | Lin et al. |
| 2012/0073662 | A1 | 3/2012 | Swager et al. |
| 2013/0082233 | A1 | 4/2013 | Afzali-Ardakani et al. |

OTHER PUBLICATIONS

R.S. Loewe et al., "A Simple Method to Prepare Head-to-Tail Coupled, Regioregular Poly(3-alkylthiophenes) Using Grignard Metathesis," Adv. Mater., 11, 250-253 (Mar. 1999).

R.S. Loewe et al., "Regioregular, Head-to-Tail Coupled Poly(3-alkylthiophenes) Made Easy by the GRIM Method: Investigation of the Reaction and the Origin of Regioselectivity," Macromolecules, 34, 4324-4333 (May 2001).

J.M. Lobez et al., "Improving the Performance of P3HT-Fullerene Solar Cells with Side-Chain-Functionalized Poly (thiophene) Additives: A New Paradigm for Polymer Design," ACS Nano, 6, 3044-3056 (Feb. 2012).

L. Zhai et al., "A Simple Method to Generate Side-Chain Derivatives of Regioregular Polythiophene via the GRIM Metathesis and Post-polymerization Functionalization," Macromolecules, 2003 36, 61-64 (Published Dec. 2002).

J.P. Folkers et al., "Self-assembled monolayers of long-chain hydroxamic acids on the native oxides of metals," Langmuir, 11, 813-824 (Mar. 1995).

H. Gu et al., "Fabrication of Free-standing, Conductive, and Transparent Carbon Nanotube Films," Advanced Materials, vol. 20, No. 23, pp. 4433-4437 (Oct. 2008).

F. Wang et al., "Carbon nanotube/polythiophene chemiresistive sensors for chemical warfare agents," Journal of the American Chemical Society, vol. 130, No. 16, pp. 5392-5393 (Mar. 2008).

K. Stokes et al., "New phosphonic acid functionalized, regioregular polythiophenes," Macromolecules, vol. 36, No. 19, pp. 7114-7118 (Aug. 2003).

Schnorr et al., "Emerging Application of Carbon Nanotubes," Chem. Mater., 2011, 23, 646-657 (Published Nov. 2010).

J.M. Lobez et al., "Radiation Detection: Resistivity Responses in Functional Poly(Olefin Sulfone)/Carbon Nanotube Composites," Angew. Chem. Int. Ed. 2010, 49, 95-98 (published Nov. 2009).

Whitesides et al., "Self-Assembly at All Scales," Science vol. 295 (Mar. 2002).

Yamamoto et al., "Photoconductive Coaxial Nanotubes of Molecularly Connected Electron Donor and Acceptor Layers," Science, vol. 314 (Dec. 2006).

Grzelczak et al., "Directed Self-Assembly of Nanoparticles," ACS Nano, vol. 4, No. 7, 3591-3605 (Jun. 2010).

Klinke et al., "Field-Effect Transistors Assembled from Functionalized Carbon Nanotubes," Nano Letters, vol. 6, No. 5, 906-910 (Apr. 2006).

Tulevski et al., "Chemically Assisted Directed Assembly of Carbon Nanotubes for the Fabrication of Large-Scale Device Arrays," J. Am. Chem. Soc. 2007, 129, 11964-11968 (Sep. 2007).

Wang et al., "Molecular Recognition for High Selectivity in Carbon Nanotube/Polythiophene Chemiresistors," Agnew. Chem. Int. Ed. 2008, 47, 8394-8396 (Sep. 2008).

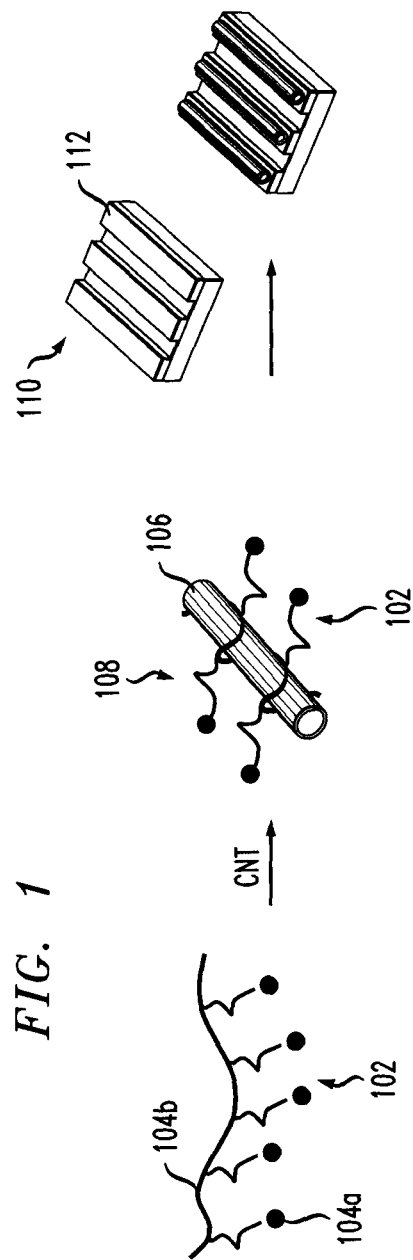
FIG. 1
FIG. 2A
202a
FIG. 2B
202b

400

FIG. 8A
FIG. 8B
FIG. 8C
 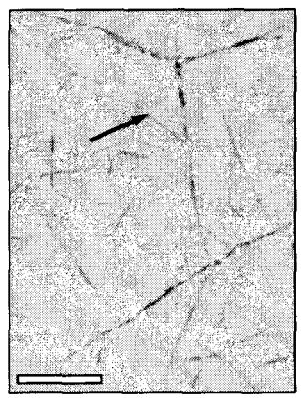 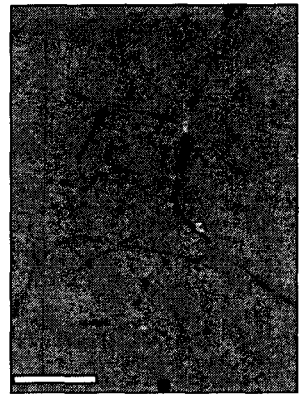
FIG. 9
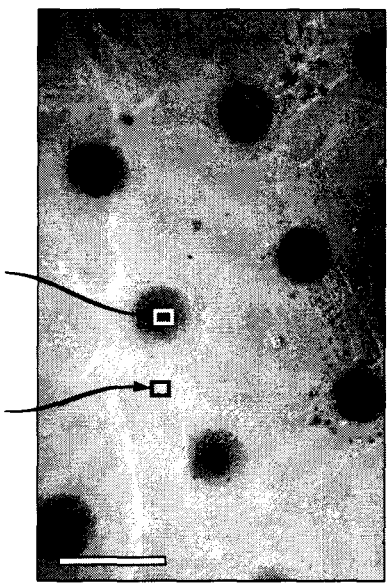

SURFACE MODIFICATION USING FUNCTIONAL CARBON NANOTUBES

CROSS-REFERENCE TO RELATED APPLICATION(S)

This application is a continuation of U.S. application Ser. No. 13/912,417 filed on Jun. 7, 2013, the disclosure of which is incorporated by reference herein.

FIELD OF THE INVENTION

The present invention relates to carbon nanotube (CNT) deposition processes and more particularly, to techniques for CNT solubilization and surface-selective deposition via polymer-mediated assembly using polymers having (e.g., thiol side chains).

BACKGROUND OF THE INVENTION

Carbon nanotubes (CNTs) are promising candidates for many different applications such as sensors, supercapacitors, electrodes, drug-delivery, batteries, transparent electrodes, photovoltaic cells, digital logic (field effect transistors (FETs) and thin film transistors (TFTs)). However, one factor limiting the widespread application of CNTs is that many of these applications would require the selective deposition of a monolayer or just a few layers of CNTs from solution onto specific areas of a substrate without covering the whole substrate with a blanket film of CNTs.

Techniques have been proposed for selective deposition of CNTs onto a substrate. See, for example, Park et al., "High-density integration of carbon nanotubes via chemical self-assembly," Nature Nanotechnology, 7, 787-791 (October 2012), the entire contents of which are incorporated by reference herein. See also, U.S. Patent Application Publication Number 2013/0082233 A1, filed by Afzali-Ardakani et al., entitled "Selective Placement of Carbon Nanotubes Via Coulombic Attraction of Oppositely Charged Carbon Nanotubes and Self-Assembled Monolayers" (hereinafter "U.S. Patent Application Publication Number 2013/0082233") the entire contents of which are incorporated by reference herein. With these conventional processes there are, however, some notable drawbacks. For example, low densities of carbon nanotubes are observed after the deposition, the CNTs cannot be deposited over large areas, there is a lack of specificity on the interaction with the surface which leads to uncontrolled CNT deposition everywhere in the substrate, not just in the areas of interest, and there is a lack of stability of the CNT dispersion, which makes storage and use of these solutions difficult.

Therefore, improved techniques for effective, surface-selective deposition of CNTs would be desirable.

SUMMARY OF THE INVENTION

The present invention provides techniques for carbon nanotube (CNT) solubilization and surface-selective deposition via polymer-mediated assembly. In one aspect of the invention, a method for self-assembly of carbon nanotubes on a substrate is provided. The method includes the flowing steps. One or more surfaces of the substrate are coated with a thiol-reactive compound. The substrate is contacted with carbon nanotube-polymer assemblies dispersed in a solvent, wherein the carbon nanotube-polymer assemblies include the carbon nanotubes wrapped in a polymer having side chains with thiol groups. Wherein by way of the step of contacting the substrate with the carbon nanotube-polymer assemblies, the carbon nanotube-polymer assemblies selectively bind to the surfaces of the substrate based on an interaction between the thiol groups in the polymer and the thiol-reactive compound on the surfaces of the substrate and thereby self-assemble on the substrate.

In another aspect of the invention, a structure is provided having carbon nanotubes on a substrate, wherein one or more surfaces of the substrate are coated with a thiol-reactive compound, and wherein the carbon nanotubes are wrapped in a polymer so as to form carbon nanotube-polymer assemblies, the polymer having side chains with thiol groups, and wherein the carbon nanotube-polymer assemblies are selectively bound to the substrate based on an interaction between the thiol groups in the polymer and the thiol-reactive compound on the surfaces of the substrate.

A more complete understanding of the present invention, as well as further features and advantages of the present invention, will be obtained by reference to the following detailed description and drawings.

BRIEF DESCRIPTION OF THE DRAWINGS

FIG. 1 is a schematic diagram illustrating the present polymer-mediated directed self-assembly process according to an embodiment of the present invention;

FIG. 2A is a diagram illustrating a regioregular polythiophene with thiol groups according to an embodiment of the present invention;

FIG. 2B is a diagram illustrating a regioregular polythiophene with thiol group precursors according to an embodiment of the present invention;

FIG. 8A is a scanning electron micrograph (SEM) image of the present CNT/polymer assemblies deposited on an untreated gold surface wherein ethanolamine was used for the thiol generation according to an embodiment of the present invention;

FIG. 8B is an SEM image of the present CNT/polymer assemblies deposited on an untreated gold surface wherein pyridine was used for the thiol generation according to an embodiment of the present invention;

FIG. 8C is an SEM image of the present CNT/polymer assemblies deposited on an untreated gold surface wherein triethylamine was used for the thiol generation according to an embodiment of the present invention;

FIG. 9 is a scanning electron micrograph (SEM) image of patterned substrates of gold (Au) dots on hafnium oxide (HfO$_2$) after (polymer-mediated) directed self-assembly of carbon nanotube (CNT)/polymer assemblies according to an embodiment of the present invention;

DETAILED DESCRIPTION OF PREFERRED EMBODIMENTS

Figure 3:
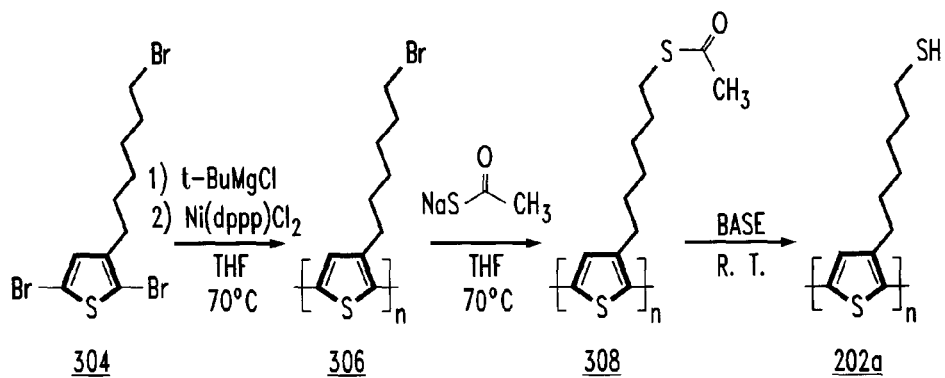
FIG. 3 is a diagram illustrating synthesis of poly(thiophene)s with functional side-chains bearing thiol groups from a parent poly(thiophene) polymer with alkylbromide side-chains according to an embodiment of the present invention.

Provided herein are techniques for the selective deposition of thin films of carbon nanotubes (CNTs) on specific surfaces using on polymer-mediated directed self-assembly. An exemplary polymer presented herein contains thiol groups on its side chains, and thereby can interact with select surfaces of a substrate via ligand-metal and/or covalent interactions between the side chains and the substrate surface.

With the present techniques, a CNT/polymer combination can be used for CNT deposition and further device fabrication. The polymer has a backbone capable of binding strongly to the surface of the CNTs. The polymer also has side chains with thiol groups which can serve to provide selective interaction with certain substrate via ligand-metal and/or covalent interactions. See FIG. 1.

FIG. 1 is a schematic diagram illustrating the present polymer-mediated directed self-assembly process. As shown in FIG. 1, in this example, the polymer-mediated assembly employs a polymer with thiol groups on its side chains. For instance as shown in FIG. 1, the present polymer 102 with thiol groups on its side chains 104a and a backbone 104b capable of wrapping around CNTs 106 to form CNT/polymer assemblies 108.

A substrate 110 is provided having specific areas 112 that are configured to interact with the thiol groups on the side chains 104a of the polymer 102. By way of example only, these specific areas 112 of the substrate can be coated with a metal, such that a ligand-metal interaction between the thiol groups and the metal will mediate the assembly of the CNT/polymer assemblies 108 on the substrate. Nanoparticles or any other nanostructures of specific materials capable of interacting with the aforementioned polymer can also be coated with CNTs using this technique.

Once the CNT/polymer assemblies 108 are deposited onto the specific areas 112 of the substrate 110, the CNT/polymer assemblies 108 will self-assemble on the substrate (mediated by the polymer)—thus leading to selective deposition of the CNTs on only desired portions of the substrate. Once the CNTs have been (selectively) deposited onto the substrate, the polymer can be removed, if so desired. The polymer can be removed using thermal annealing, effectively leaving behind only the CNTs on the desired parts of the substrate (see FIG. 1). For example, if the substrate with the assembled CNTs is heated up to elevated temperatures (e.g., greater than about 400° C.), the polymer degrades into volatile organic molecules, leaving only the CNTs behind without disrupting the optical and electronic properties of the CNTs. Regular CMOS fabrication steps can then follow to complete device fabrication.

As will be described in detail below, these functional polymers are used to disperse the CNTs, and modular modifications on the chemical structure of the polymer's side-chain have a large impact on the surface properties of the polymer-coated CNTs. These slight chemical modifications highly influence CNT solubility and enable surface-selective CNT deposition from solution using directed self-assembly based on metal-ligand/covalent bond interactions involving the thiol groups on the side-chain of the polymer.

According to an exemplary embodiment, the polymer is a regioregular polythiophene 202 with thiol groups or thiol group precursors (i.e., protected/masked thiol groups) on the side chains. See FIGS. 2A-B. FIG. 2A is a diagram illustrating a regioregular polythiophene with thiol groups and FIG. 2B is a diagram illustrating a regioregular polythiophene with thiol group precursors. As is known in the art, functional groups like thiols can be protected (one could also say masked, transformed, etc.) into a different functional group in order to avoid undesired reactions, such as thiol-thiol reaction and disulfide formation. A possible example would be to have the thiol be a thioester:) —S—CO—R, which can then be hydrolized to produce a thiol on demand.

Polymers 202a/b are capable of interacting with the walls of the CNTs and with an organic solvent, effectively bringing them into solution. The dispersion of the polymer-coated CNTs is stable over time and high concentrations of CNTs of from about 0.1 milligrams per milliliter to about 20 milligrams per milliliter can be achieved this way.

The backbone of poly(thiophene)s can wrap around the surface of CNTs via pi-pi stacking by way of the extended aromatic system of thiophene rings, effectively decorating the CNT surface with the functional groups on the poly (thiophene) side-chain without disrupting the optical and electronic properties of the CNTs. For a description of pi-pi stacking see, for example, Gu et al., "Fabrication of Freestanding, Conductive, and Transparent Carbon Nanotube Films," *Adv. Mater.*, 20, 4433-4437 (October 2008), the entire contents of which are incorporated by reference herein.

In one exemplary implementation of the present techniques, poly(thiophene)s with thiol groups on the side chains were synthesized from a parent poly(thiophene) polymer 306 with alkylbromide side-chains. See FIG. 3. As shown in FIG. 3, this parent poly(thiophene) polymer 306 was synthesized from the corresponding 2,5-dibromo-3-(6-bromohexyl) thiophene monomer 304 using Grignard metathesis (GRIM) polymerization for the synthesis of substituted regioregular poly(thiophene)s. See, for example, R. D. McCullough et al., "Enhanced electrical conductivity in regioselectively synthesized poly(3-alkylthiophenes)," *J. Chem. Soc., Chem. Commun.*, 70-72 (January 1992); R. S. Loewe et al., "A Simple Method to Prepare Head-to-Tail Coupled, Regioregular Poly (3-alkylthiophenes) Using Grignard Metathesis," *Adv. Mater.*, 11, 250-253 (March 1999); R. S. Loewe et al., "Regioregular, Head-to-Tail Coupled Poly(3-alkylthiophenes) Made Easy by the GRIM Method: Investigation of the Reaction and the Origin of Regioselectivity," *Macromolecules*, 34, 4324-4333 (May 2001); J. M. Lobez et al., "Improving the Performance of P3HT-Fullerene Solar Cells with Side-Chain-Functionalized Poly(thiophene) Additives: A New Paradigm for Polymer Design," *ACS Nano*, 6, 3044-3056 (February 2012). The entire contents of each of the foregoing references are incorporated by reference herein.

The desired functional groups were incorporated by post-polymerization modifications using a nucleophilic substitution reaction, which is a modular approach for introducing a wide variety of chemical moieties into the side-chains of conjugated polymers. See L. Zhai et al., "A Simple Method to Generate Side-Chain Derivatives of Regioregular Polythiophene via the GRIM Metathesis and Post-polymerization Functionalization," *Macromolecules*, 2003 36, 61-64 (Published December 2002), the entire contents of which are incorporated by reference herein. In order to obtain a poly(thiophene) 202a decorated with thiols in the side chain, polymer 306 was reacted with sodium thioacetate. The resulting polymer with thioester side-chains 308, which is soluble in organic solvents, could be hydrolyzed with an organic base such as ethanolamine in tetrahydrofuran (THF) to yield the free thiol functional groups in the polymer side chain.

Figure 4:
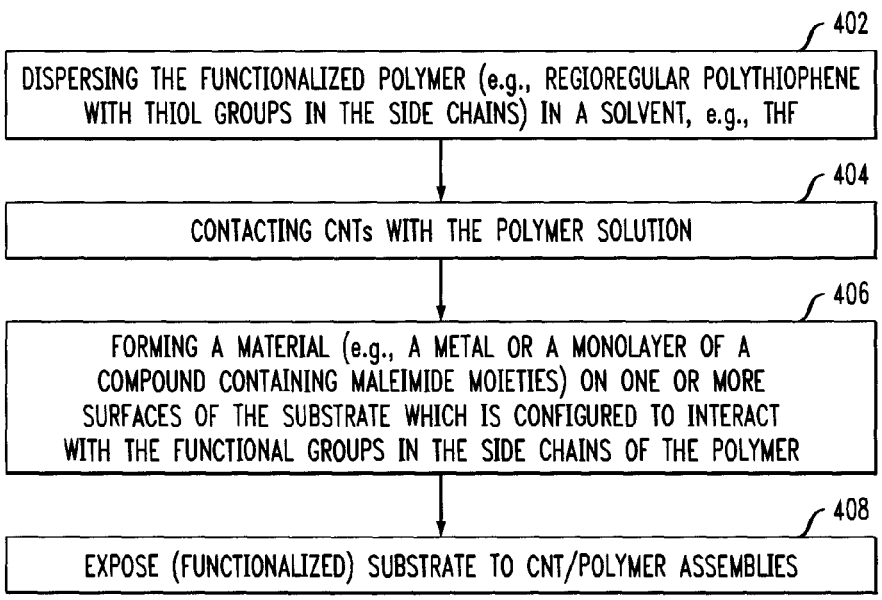
FIG. 4 is a diagram illustrating an exemplary methodology for self-assembly of carbon nanotubes (CNTs) on a substrate using surface-selective deposition of the CNTs via polymer-mediated assembly according to an embodiment of the present invention.

FIG. 4 is a diagram illustrating an exemplary methodology 400 for self-assembly of CNTs on a substrate using surface-selective deposition of CNTs via polymer-mediated assembly. In step 402, the above-described functionalized polymer (e.g., regioregular polythiophene with thiol groups in the side chains synthesized as described above) is dispersed in a solvent. Suitable solvents include, but are not limited to, THF, chloroform ($CHCl_3$), dimethylformamide (DMF), and N-methyl-2-pyrrolidone (NMP). Sonication may be used to help in the dispersion.

Next, in step 404, CNTs (e.g., single-walled carbon nanotubes (SWCNTs)) are contacted with the polymer dispersion (from step 402). For example, the CNTs can be added to the polymer dispersion and sonication used to aid in mixing. As described above, the present functional polymers have charged side chains and a backbone capable of wrapping around CNTs (via pi-pi stacking) to form CNT/polymer assemblies. Thus these CNT/polymer assemblies are formed in step 404, dispersed in the solvent.

According to an exemplary implementation of the present techniques, dispersions of SWCNTs in organic solvents are obtained using the protected thioacetate analog of the polymer (e.g., polymer 202b—see FIG. 2B and description above) using an analogue procedure. Polymer 308, the thioacetate precursor of polymer 202a can be used for CNT dispersion instead of the thiol for stability purposes and hydrolyzed in situ at the moment of CNT deposition by directed self-assembly. The CNT/polymer assemblies prepared in this manner are soluble in organic solvents such as THF and $CHCl_3$.

As highlighted above, a goal of the present process is the surface-selective, polymer-mediated assembly of the CNTs on the surface of a given substrate. This is based on complementary interactions between the thiol groups in the side chains and the surface of the substrate, e.g., a metal-ligand interaction between the thiol groups and a metal surface(s) of the substrate or a reaction of the thiol groups with a group on the surface of the substrate to form a covalent bond, see below. Thus, in step 406, the substrate is processed to create one or more surfaces having a material thereon which is configured to interact with the functional groups in the side chains of the polymer. It is on these surfaces that self-assembly of the CNTs is desired. It is noted, that while the instant example is directed to depositing the CNTs only on selected parts of the substrate, it is also true that the present method can be used to deposit blanket films of the CNTs all over the substrate if so desired. It is also notable that the steps of methodology 400 do not need to be performed in the order depicted in FIG. 4. For instance, processing of the substrate may be performed prior to, or concurrently with, the CNT and polymer preparations.

In the case where thiol functional groups are used in the polymers, processing of the substrate includes forming a layer of a thiol-reactive compound on the surfaces of the substrate on which self-assembly of the CNTs is desired. The term "thiol-reactive" as used herein indicates that when brought in contact with the thiol-bearing polymers, the compound will react/interact with the thiol groups (e.g., by metal-ligand, covalent bond, etc.). See below.

As provided above, the interaction employed for the self-assembly of the CNT/polymer assemblies on the substrate may be a metal-ligand interaction. In that case, the surface(s) of the substrate on which deposition of the CNTs is desired (which may include selective areas of the substrate, or alternatively an entire surface of the substrate) may be coated with one or more layers of a metal(s) (i.e., the thiol-reactive compound in this example is a metal(s)). Suitable thiol-reactive metals include, but are not limited to, gold (Au), silver (Ag), copper (Cu), palladium (Pd), platinum (Pt), iron (Fe), tungsten (W), cobalt (Co), rhodium (Rh), iridium (Ir), nickel (Ni), zinc (Zn), cadmium (Cd) or alloys containing at least one the foregoing metals, or any other metal or alloy capable of interacting with thiols. Many transition metals form bonds with thiols and sulfur-containing compounds and this interaction is stronger when the metal is capable of soft metal-ligand interactions. By way of example only, a layer of the metal having a thickness of from about 1 nm to about 500 µm can be formed, for example, using plating, evaporation, sputtering, etc., on those surfaces of the substrate on which deposition of the CNTs is desired.

For instance, the metal can be deposited onto the substrate, and then (if so desired) patterned using conventional lithography and etching techniques such that the metal remains on only select areas of the substrate. Another option is to deposit the metal using a patterned mask, so that the metal is deposited only on specific areas of the substrate. For instance, a lift-off technique can be employed wherein the patterned mask (and with it any extra metal) can be removed, leaving metal in the desired areas.

Via their thiol functionalized side chains, the CNT/polymer assemblies when contacted with the substrate (see below), will (selectively) interact with the metal surface(s) and thereby selective deposition of the CNTs on those metal surfaces can be achieved. In this example, according to step 406, the processing of the substrate (i.e., so as to create a metal surface(s) of the substrate which will interact with the polymer side chains via metal-ligand interactions) can be carried out by patterning a metal(s) on the surface of the substrate—as described above.

Alternatively, the interaction employed for the self-assembly of the CNT/polymer assemblies on the substrate may be an interaction between the functional (e.g., thiol) groups in the polymer side chains and functional groups on the substrate, such that a covalent bond is formed between the functional groups. By way of example only, one or more surfaces (or the entire surface) of the substrate may be functionalized with a monolayer of maleimide-bearing molecules (i.e., the thiol-reactive compound in this case includes a maleimide). A maleimide imide will interact with a thiol forming a covalent bond between the groups.

Further, the present techniques can leverage the fact that certain compounds, such as hydroxamic acid, selectively interact with certain materials over silicon dioxide. See, for example, J. P. Folkers et al., "Self-assembled monolayers of long-chain hydroxamic acids on the native oxides of metals," *Langmuir*, 11, 813-824 (March 1995), and H. Park et al., "High-density integration of carbon nanotubes via chemical self-assembly," *Nature Nanotech.*, 7, 787-791 (October 2012). The entire contents of each of the foregoing references are incorporated by reference herein. See also, U.S. Patent Application Publication Number 2013/0082233 which describes an exemplary process for decorating a surface of a substrate with a charge. In one exemplary embodiment, the monolayer includes a positively charged pyridinium salt bearing a hydroxamic acid moiety, NMPI (4-(Nhydroxycarboxamido)-1-methylpyridinium iodide).

Hydroxamic acids and phosphonic acids selectively bind to surfaces which are relatively basic, but they do not bind to surfaces which are more acidic. This can be thought of as an acid/base reaction. For instance, hafnium oxide is relatively basic, so hydroxamic/phosphonic acid binds to it, and silicon dioxide is relatively acidic, so hydroxamic/phosphonic acid does not bind to it. Other examples of surfaces to which hydroxamic acids and phosphonic acids bind (selectively over binding to silicon dioxide) are silicon nitride and aluminum oxide.

It is believed that surfaces with an isoelectric point greater than the pKa of the acid (hydroxamic, phosphonic) used for the self-assembly will give better directed self-assembly in general, due to deprotonation of the acid. See, for example, Folkers et al., "Self-Assembled Monolayers of Long-Chain Hydroxamic Acids on the Native Oxides of Metals," Langmuir, 11, 813-824 (March 1995), the entire contents of which are incorporated by reference herein. This is true for silicon nitride, aluminum oxide, hafnium oxide. Conversely, surfaces with an isoelectric point less than the pKa of the acid (hydroxamic, phosphonic) used for the self-assembly will give worse/no directed self-assembly. This is true for silicon dioxide.

Thus, in general, according to the present techniques—those surfaces for which self-assembly of the monolayer is desired will be formed from a material having an isoelectric point greater than the pKa of the acid (hydroxamic, phosphonic) used for the self-assembly, and those surfaces for which self-assembly of the monolayer is not desired will be formed from a material having an isoelectric point that is less than the pKa of the acid. Non-limiting examples include hafnium oxide and silicon dioxide, respectively.

Thus when hydroxamic acid is used for the self-assembly, the starting wafer can be, for example, a semiconductor wafer having a layer of a first material with an isoelectric point that is less than the pKa of hydroxamic acid, such as $SiO_2$. A patterned layer of a second material with an isoelectric point that is greater than the pKa of hydroxamic acid, such as silicon nitride, $HfO_2$ and/or aluminum oxide ($Al_2O_3$), can be formed on the first material using conventional lithography and etching techniques. As noted above, it may be instead desired to cover the entire surface of the substrate (as opposed to selective areas) with the CNTs, in which case, the whole surface of the substrate would be decorated with the second material. Basically, the second material should be present anywhere on the substrate where deposition of the CNTs is desired.

Namely, the pattern of the second material will dictate where on the surface of the wafer the CNTs will be present since, 1) the monolayer (e.g., bearing maleimide imide functional groups) will interact with the second material (and not the first material) on the wafer, and 2) the CNT/polymer assemblies will self-assemble on the monolayer based on covalent bond interactions between the functional groups in the polymer side chains and the functional groups in the monolayer. In this example, according to step 406, the processing of the substrate (i.e., so as to create a monolayer on a surface(s) thereof configured to interact with the polymer side chains) can be carried out by contacting the patterned substrate (prepared as described above) with a compound (e.g., immersing the substrate in a solution of the compound or drop casting the solution on the substrate) containing i) a phosphonic acid or a hydroxamic acid (that binds to the second material selectively—see above) and ii) a maleimide, effectively generating a layer of a maleimide-containing compound only on the second material of the substrate.

Figure 5:
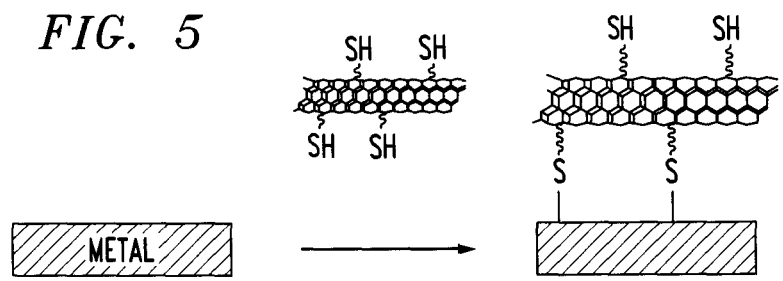
FIG. 5 is a schematic diagram illustrating the interaction of the CNT/polymer assemblies (bearing thiol groups in the polymer side chains) with a metal surface(s) of the substrate according to an embodiment of the present invention.
Figure 6:
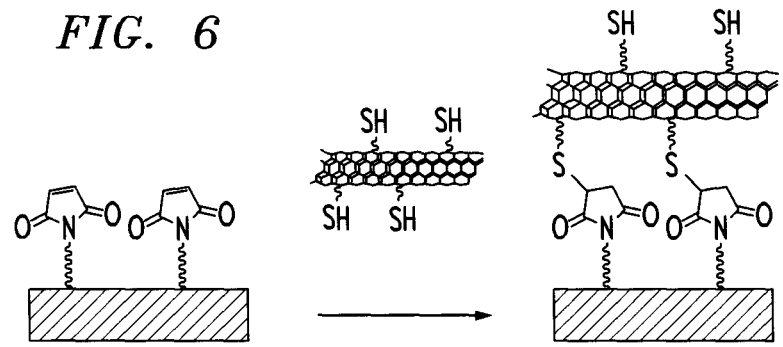
FIG. 6 is a schematic diagram illustrating the interaction of the CNT/polymer assemblies (bearing thiol groups in the polymer side chains) with a surface(s) of the substrate coated with a monolayer bearing maleimide moieties according to an embodiment of the present invention.

The interaction between the functionalized CNT/polymer assemblies and the processed surface(s) of the substrate are illustrated schematically in FIGS. 5 and 6. Specifically, FIG. 5 is a schematic diagram illustrating the interaction of the CNT/polymer assemblies (bearing thiol groups in the polymer side chains) with a metal surface(s) of the substrate. FIG. 6 is a schematic diagram illustrating the interaction of the CNT/polymer assemblies (bearing thiol groups in the polymer side chains) with a surface(s) of the substrate coated with a monolayer bearing maleimide moieties.

Figure 7:
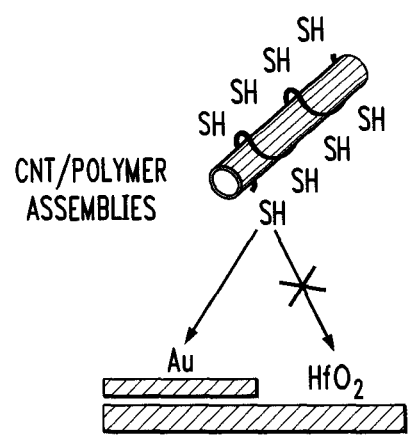
FIG. 7 is a schematic diagram illustrating the selective interaction of the (thiol bearing) CNT/polymer assemblies with metal surfaces of a substrate according to an embodiment of the present invention.

FIG. 7 is a schematic diagram illustrating the selective interaction of the (thiol bearing) CNT/polymer assemblies with metal surfaces of a substrate. The example shown in FIG. 7 is that of a substrate having a patterned gold (Au) layer over a (non-metal) $HfO_2$ layer produced using the above-described process. As shown in FIG. 7, the CNT/polymer assemblies react with the Au-covered surfaces of the substrate and do not interact with the non-metal surfaces of the substrate. Although not shown, the interaction between the CNT/polymer assemblies and a processed substrate having a monolayer of compound bearing (e.g., maleimide) functional groups would proceed in the same manner as that shown in FIG. 7. Namely, the (thiol bearing) CNT/polymer assemblies would react with the surfaces of the substrate coated with the monolayer (e.g., wherein covalent bonds would form between the thiol groups and the maleimide moieties) and would not react with the (e.g., $SiO_2$—see above) surfaces not coated with the monolayer.

Referring back to FIG. 4, in step 408, the processed (metal/monolayer-coated) substrate is then exposed to the solution of CNT/polymer assemblies prepared as described above. By way of example only, the solution of the CNT/polymer assemblies can be deposited onto the substrate, followed by a rinse to remove excess solution. As a result of the interaction of the thiol groups in side chains of the CNT/polymer assemblies with the processed (metal/monolayer-coated) surfaces of the substrate, the CNTs will self-assemble on the surface of the substrate forming a (self-assembled) layer of CNTs or an array of individual CNTs on the substrate. In the example provided above, the CNT/polymer assemblies (bearing thiol groups in their side chains) will self-assemble on the metal/monolayer-coated surfaces of the patterned substrate forming a CNT layer/array. The final CNT layer/array will include the CNT/polymer assemblies, unless (as described above) the polymer is removed. Any remaining solvent can be removed by drying the substrates with a stream of air or nitrogen.

As highlighted above, the present process can be implemented to form a layer of CNTs or an array of individual CNTs on a substrate. When formed as a layer, the CNTs are not regularly aligned, and overlap and/or contact one another. By contrast, in an array, the CNTs are regularly aligned, and do not overlap or contact one another. An array of individual CNTs may be preferable when devices are being fabricated which require individual CNTs to form the device. For instance, when the device features that are capable of interacting with the CNTs specifically are small enough (in the order of magnitude of about 100 nanometers or less), only one CNT fits inside the feature. After deposition of an array of individual CNTs, regular electrode deposition steps used for CMOS fabrication can be used to obtain transistors of each individual CNT in the array. There are instances in which obtaining an array of those individually placed CNTs would be advantageous, for instance if one wants to fabricate arrays of transistors of individual CNTs. This is interesting for digital logic applications based on CNTs.

Whether a layer of CNTs or an array of individual CNTs is formed on the substrate can be regulated by tailoring the above-described process. For instance, to attain an array of individual CNTs (as opposed to a layer), the substrate surface modifications (described above) can be configured such that the features are small enough that only a fraction of the CNTs interacts. Additionally, the carbon nanotube-polymer assembly dispersion can be diluted (e.g., with additional solvent) to reduce the number of CNTs deposited on a given area of the substrate. These techniques can be employed individually, or in combination with one another.

A process for surface-selective polymer-mediated assembly of CNTs via electrostatic interactions between charged functional groups on the polymer and charged surfaces of a substrate are described, for example, in U.S. patent application Ser. No. 13/912,403, filed on Jun. 7, 2013, entitled "Surface-Selective Carbon Nanotube Deposition Via Polymer-Mediated Assembly," the entire contents of which are incorporated by reference herein.

The present techniques have the following advantages: (1) high density placement of tens of CNTs per square micrometer can be observed using this technique—good coverage is usually necessary for the applications described above; (2) the CNTs can be deposited over large macroscopic areas of several centimeters to meters of a material with any shape or roughness, which increases the number of possible use cases for this technology—nanoparticles can also be coated with CNTs using this approach; (3) the interaction used for the deposition of the CNTs is specific, which means that some areas of the substrate can be coated with CNTs while other areas are not; (4) the chemical modification of the CNT surface by polymer-wrapping used for directed self-assembly of the carbon nanotubes can also be used to create stable dispersions of the nanotubes in organic solvents—unmodified carbon nanotubes tend to aggregate and come out of solution, which makes manipulation and fabrication using CNTs difficult; (5) the mechanism of interaction for the self-assembly does not rely on electrostatic interactions, which is advantageous when working at smaller feature-size regimes where repulsion between similarly charged compounds might arise; and (6) the thiol groups on the side-chain of the polymer used for the self-assembly can be protected for improved long-term stability of the CNT dispersions and to prevent undesired reaction with unwanted substrates.

The following non-limiting example illustrates the above-described process for functionalizing the surface of a substrate and polymer-mediated assembly of the CNT/polymer assemblies on the functionalized substrate in accordance with the present techniques. In this example, the substrates employed included both metal-coated (see, for example, FIG. 7, described above) and (e.g., $HfO_2$) substrates not coated with a metal. Thus, in this example, a directed self-assembly strategy using the present (thiol group-bearing) CNT/polymer assemblies based on metal-ligand interactions was studied. The assembly on gold substrates was studied using CNT dispersions in THF with polymer 308, the thioacetate precursor of polymer 202a to avoid stability issues. A base was added to these dispersions in the presence of the substrate to induce in-situ thioester hydrolysis and thiol formation during the deposition. Different bases were tested for this purpose: ethanolamine, triethylamine and pyridine. Thioester hydrolysis occurred faster when using ethanolamine as evidenced by the fact that after 2 hours of deposition in the presence of this base, the highest density of CNTs on the gold surface could be observed for all 3 bases.

See, for example, FIGS. 8A-C. FIGS. 8A-C are SEM images of the present CNT/polymer assemblies deposited on an untreated gold surface using different bases for thiol generation. Specifically, FIG. 8A is an SEM image of the present CNT/polymer assemblies deposited on an untreated gold surface wherein ethanolamine was used for the thiol generation. FIG. 8B is an SEM image of the present CNT/polymer assemblies deposited on an untreated gold surface wherein pyridine was used for the thiol generation. FIG. 8C is an SEM image of the present CNT/polymer assemblies deposited on an untreated gold surface wherein triethylamine was used for the thiol generation. CNTs are indicated with an arrow in each of the images. The scale bar at the bottom left of the images shown in FIGS. 8A-C equals 1 micrometer.

In order to study the selectivity and efficiency of this directed self-assembly, plasma-cleaned $HfO_2$ substrates patterned with gold dots were used for the self-assembly. The substrates were configured in the manner shown in FIG. 7, described above. The directed self-assembly of the present CNT/polymer assemblies was observed selectively only on the areas of the substrate covered with gold (see FIG. 9), where the CNT density was very high as evidenced by scanning electron micrograph (SEM) (see FIG. 10).

FIG. 9 is an SEM image of patterned substrates of gold (Au) dots on $HfO_2$ after directed self-assembly of the present CNT/polymer assemblies. The scale bar at the bottom left of the image equals 200 micrometers. A magnified view of the (CNT-covered) Au areas of the wafer is shown in FIG. 10 and a magnified view of the $HfO_2$ areas with no CNT is shown in FIG. 11.

Figure 10:
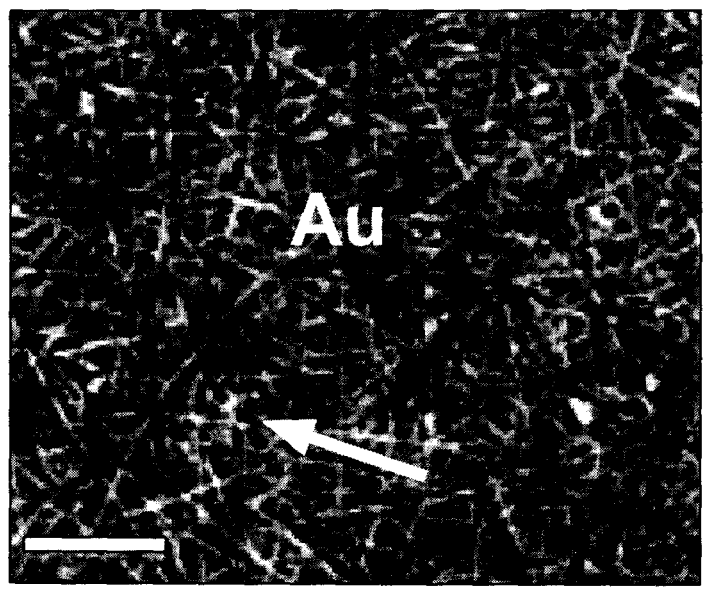
FIG. 10 is a magnified view of the image of FIG. 9 showing how the Au areas of the substrate are covered with CNTs according to an embodiment of the present invention.
Figure 11:
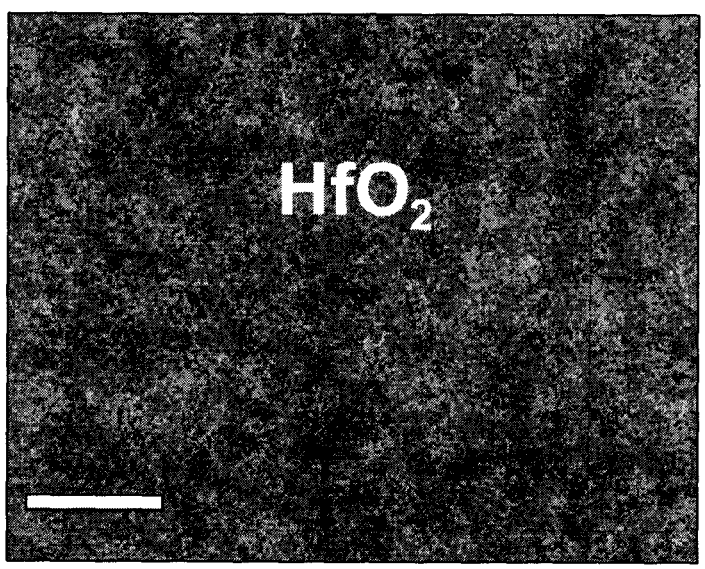
FIG. 11 is a magnified view of the image of FIG. 9 showing how the HfO$_2$ areas of the substrate have no CNTs according to an embodiment of the present invention

As shown in FIG. 10, areas with CNTs have a texture and CNTs are indicated by an arrow. The scale bar at the bottom left of the images shown in FIGS. 10 and 11 equals 100 nanometers. All of the SEM images were taken at 1 kilovolt.

Figure 12:
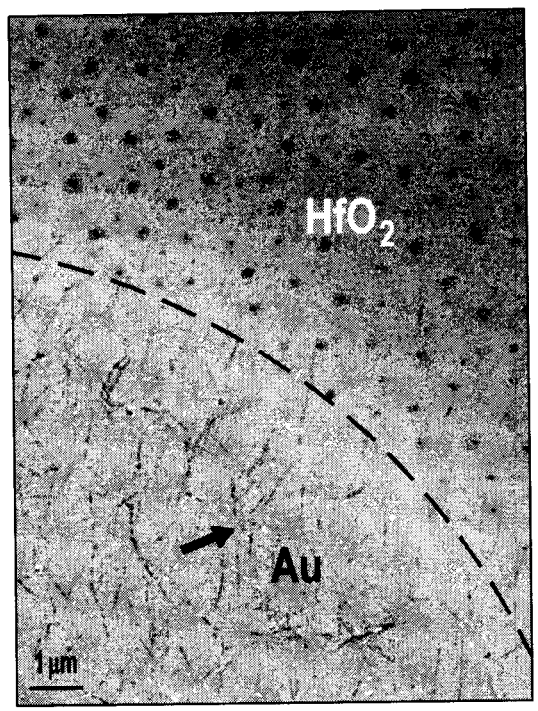
FIG. 12 is an SEM image showing the selective deposition of the CNT/polymer assemblies on Au/HfO$_2$ patterned substrates according to an embodiment of the present invention.
Figure 13:
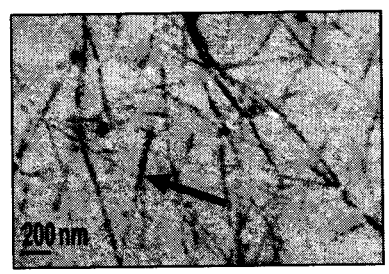
FIG. 13 is a magnified view of the image of FIG. 12 showing the detail of the gold areas according to an embodiment of the present invention.

When plasma cleaning of the substrates was not performed prior to the deposition, the density of CNTs being deposited on the gold patterns was much lower, even though the selectivity was still really high. See, for example, FIG. 12 and FIG. 13. FIG. 12 is an SEM image showing the selective deposition of the CNT/polymer assemblies on $Au/HfO_2$ patterned substrates. The dotted curve in the figure indicates the boundary for the Au dot. FIG. 13 is an SEM image showing a detail of the gold areas.

This shows the importance of surface cleaning and treatment for self-assembly purposes. When no base was added to induce the thioester hydrolysis during the self-assembly, CNT deposition occurred with very low CNT density and no selectivity, and the CNTs were easily detached by sonication. This is explained by the fact that in this latter case there was no thiol-gold interaction to direct the self-assembly and to keep the CNTs on the surface.

The present techniques are further illustrated by way of reference to the following non-limiting example:

Instruments:

NMR spectra were obtained on a Bruker Avance (400 MHz). NMR chemical shifts are given in ppm referenced to $CHCl_3$/TMS (7.24 ppm for $^1H$). Polymer molecular weights were determined at room temperature on a Waters 2695 GPC system in THF at 1.0 mL/min (1 mg/mL sample concentrations), approximate molecular weights were estimated using a polystyrene calibration standard. Scanning Electron Microscopy (SEM) images were obtained using a LEO 1560 at 1 keV, 20 μm aperture. Substrates were cleaned with a plasma cleaner from Harrick Plasma, model PDC-32G. MiliQ water was obtained using a Q-Pod from Milipore. The probe sonicator used for these experiments was a SONICS from Vibra Cell. CNT bundles were removed by centrifugation using an IEC Centra CL2.

Self-Assembly of CNT/Polymer Assemblies from THF:

For the deposition of CNTs wrapped in polymer 202a, 3 milligrams of the thioester version of polymer 202a were dissolved in 10 milliliters THF, to which 2 milligrams of CNTs were added. The resulting mixture was sonicated using a probe sonicator for 45 minutes. The CNT dispersion was centrifuged for 30 minutes to remove CNT bundles and the supernatant was filtered through a PTFE filter (0.22 micrometer pore size). The filter was washed with 100 milliliters of THF to remove excess polymer and the residue was resonicated into 10 milliliters of THF with a bath sonicator. The CNT dispersion was sonicated using a probe sonicator for 45 minutes, followed by centrifugation for 30 minutes to remove CNT bundles. The resulting supernatant was used for the directed self assembly of the CNTs. A few drops of the corresponding base were added right before the CNT assembly to deprotect the thiol groups of the polymer. Patterned substrates of Au on $HfO_2$ were plasma cleaned for 3 minutes and used for the deposition. Exposure of these substrates to the CNT/polymer assembly solution for 2 hours led to the self-assembly of thin films of CNTs with very high density and selectivity in the Au parts of the substrate.

Polymer Synthesis:

Unless otherwise noted, all reactions were performed in oven-dried glassware, and under an oxygen-free atmosphere of nitrogen. Polymerizations were carried out using standard Schlenk techniques. Anhydrous solvents and all other chemicals were obtained from Sigma-Aldrich and were used as received. 2,5-dibromo-3-(6-bromohexyl)thiophene2 and NMPI1 were synthesized as previously described in the literature. CNTs (ASP) were obtained from Hanwha Nanotech and used as received.

Figure 14:
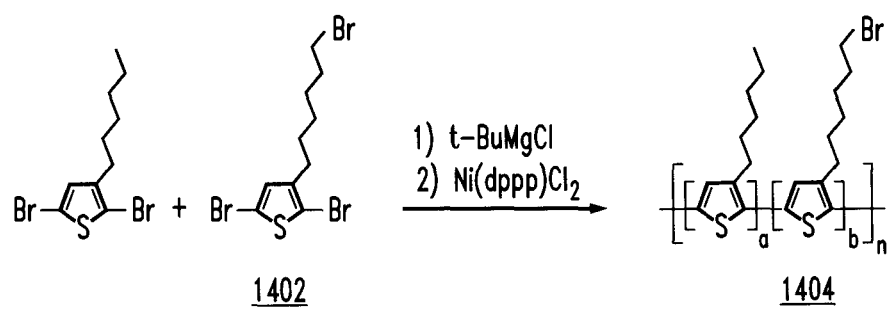
FIG. 14 is a diagram illustrating an exemplary process for the synthesis of poly(thiophene)s with alkylbromide side-chains according to an embodiment of the present invention.

General Procedure for the Synthesis of Poly(Thiophene)s with Alkylbromide Side-Chains:

An exemplary process for the synthesis of poly (thiophene)s with alkylbromide side-chains is shown in FIG. 14. In this example, regioregular poly(thiophene)s with different degrees of side-chain substitution were synthesized from the corresponding 2,5-dibromo-3-hexylthiophene and 2,5-dibromo-3-(6-bromohexyl)thiophene 1402. To a solution of the appropriate feed ratio of functionalized 1402 and unfunctionalized monomer (1 eq) in dry THF was added t-BuMgCl (1.0 M in THF, 1 eq) at room temperature. The reaction mixture was then heated to 70° C., and after stirring for 2 hours, NidpppCl2 (1.4 mol %) dispersed in 1 milliliter dry THF was added via cannula. The reaction was observed to immediately turn deep orange and fluorescent yellow. After stirring for 12 hours, the resulting polymer was precipitated from methanol. The resulting dark purple solid was re-dissolved in CHCl3 and re-precipitated in MeOH and dried under vacuum. The resulting polymer contained the same ratio of functionalized to unfunctionalized repeat units as the initial feed ratio of the two different monomers, as confirmed by 1H-NMR. For the precursor of the present (thiol group) polymers with bromide side-chains on every repeat unit, poly (3-(6-bromohexylthiophene)) 306 (a=0, b=n), 80% yield. Mn=24K, PDI=1.4, 1H-NMR (CDCl$_3$, ppm): 1.20-1.80 (bm, 8H), 2.81 (b, 2H), 3.41 (b, 2H), 6.96 (bs, 1H). For poly(3-hexylthiophene), (a=n, b=0), 85% yield. Mn=22K, PDI=1.3, 1H-NMR (CDCl3, ppm): 0.80-1.20 (bt, 3H), 1.20-1.42 (m, 4H), 1.82 (bt, 2H), 2.81 (t, 2H), 6.96 (bs, 1H).

Synthesis of poly(3-hexylthiolacetate thiophene)

Figure 15:
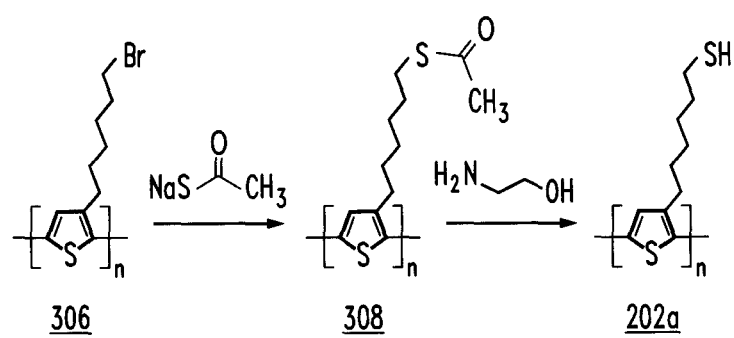
FIG. 15 is a diagram illustrating an exemplary process for the synthesis of poly(3-hexylthiolacetate thiophene according to an embodiment of the present invention.

An exemplary process for the synthesis of poly(3-hexylthiolacetate thiophene) is shown in FIG. 15. In this example, 50 milligrams of poly(3-(6-bromohexylthiophene)) 306 were dissolved in 5 ml THF. An excess of potassium thioacetate (250 milligrams, 10 eq), was added and the reaction was heated to 70° C. overnight. The solvent was evaporated and the resulting residue was taken up in chloroform, and precipitated by addition to an excess of methanol. This procedure was repeated twice to obtain the desired polymer with a thioacetate ester in the side-chains of every repeat unit, 308 90% yield. Mn=25K, PDI=1.4, 1HNMR (CDCl$_3$, ppm): 1.20-1.80 (bm, 8H), 2.30 (bs, 3H), 2.80-2.95 (bm, 4H), 6.96 (bs, 1H). Treatment with a base rendered the free thiol in the side-chain.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A structure comprising:
   carbon nanotubes on a substrate, wherein one or more surfaces of the substrate are coated with a thiol-reactive compound, and wherein the carbon nanotubes are wrapped in a polymer so as to form carbon nanotube-polymer assemblies, the polymer being a regioregular polythiophene having side chains with thiol groups, and
   wherein the carbon nanotube-polymer assemblies are selectively bound to the substrate based on an interaction between the thiol groups in the polymer and the thiol-reactive compound on the surfaces of the substrate.

2. The structure of claim 1, wherein the thiol-reactive compound comprises a metal, and wherein the carbon nanotube-polymer assemblies selectively bind to the surfaces of the substrate based on a metal-ligand interaction between the thiol groups in the polymer and the metal.

3. The structure of claim 2, wherein the metal is selected from the group consisting of: gold, silver, copper, palladium, platinum, iron, tungsten, cobalt, rhodium, iridium, nickel, zinc, cadmium, and alloys containing at least one the foregoing metals.

4. A structure comprising:
   carbon nanotubes on a substrate, wherein one or more surfaces of the substrate are coated with a thiol-reactive compound, and wherein the carbon nanotubes are wrapped in a polymer so as to form carbon nanotube-polymer assemblies, the polymer having side chains with thiol groups, and
   wherein the carbon nanotube-polymer assemblies are selectively bound to the substrate based on an interaction between the thiol groups in the polymer and the thiol-reactive compound on the surfaces of the substrate, and
   wherein the polymer wraps around the carbon nanotubes via pi-pi stacking.

5. A structure comprising:
   carbon nanotubes on a substrate, wherein one or more surfaces of the substrate are coated with a thiol-reactive compound, and wherein the carbon nanotubes are wrapped in a polymer so as to form carbon nanotube-polymer assemblies, the polymer having side chains with thiol groups, and wherein the carbon nanotube-polymer assemblies are selectively bound to the substrate based on an interaction between the thiol groups in the polymer and the thiol-reactive compound on the surfaces of the substrate, and wherein the thiol-reactive compound comprises maleimide moieties, and wherein the carbon nanotube-polymer assemblies selectively bind to the surfaces of the substrate based on covalent bonds formed between the thiol groups in the polymer and the maleimide moieties.

6. The structure of claim 5, wherein the substrate comprises at least one first region comprising at least one first material and at least one second region comprising at least one second material, and wherein the thiol-reactive compound comprising maleimide moieties is configured to selectively interact with the second material as opposed to the first material, such that the thiol-reactive compound comprising maleimide moieties is formed only on a surface of the second region of the substrate.

7. The structure of claim 6, wherein the first material comprises silicon dioxide.

8. The structure of claim 6, wherein the second material comprises hafnium oxide.

\* \* \* \* \*